(12) United States Patent
Dong et al.

(10) Patent No.: US 12,348,826 B2
(45) Date of Patent: Jul. 1, 2025

(54) HOTSPOT LIST DISPLAY METHOD, ELECTRONIC DEVICE, AND STORAGE MEDIUM

(71) Applicant: BEIJING ZITIAO NETWORK TECHNOLOGY CO., LTD., Beijing (CN)

(72) Inventors: Zesong Dong, Beijing (CN); Qi Wang, Beijing (CN); Xiaolu Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/315,966

(22) Filed: May 11, 2023

(65) Prior Publication Data
US 2023/0283858 A1    Sep. 7, 2023

Related U.S. Application Data (63) Continuation of application No. PCT/CN2021/128790, filed on Nov. 4, 2021.

(30) Foreign Application Priority Data

Nov. 11, 2020  (CN) .......................... 202011255844.2

(51) Int. Cl.
*H04N 21/482*  (2011.01)
*H04N 21/2343*  (2011.01)

(52) U.S. Cl.
CPC . *H04N 21/4826* (2013.01); *H04N 21/234363* (2013.01)

(58) Field of Classification Search
CPC .................. H04N 21/4826; H04N 21/234363
(Continued)

(56) References Cited

U.S. PATENT DOCUMENTS

2010/0002069 A1   1/2010   Eleftheriadis et al.
2015/0121263 A1*  4/2015   Yeh ..................... G06F 3/04883
                                                                        715/765
(Continued)

FOREIGN PATENT DOCUMENTS

CN          105094858 A       11/2015
CN          106095816 A       11/2016
(Continued)

OTHER PUBLICATIONS

International Search Report issued Jan. 12, 2022 in International Application No. PCT/CN2021/128790, with English translation (4 pages).

(Continued)

*Primary Examiner* — Francis Z. Santiago Merced (57) ABSTRACT

Provided are a hotspot list display method, an electronic device, and a storage medium. The hotspot list display method includes the following: The screen height of a screen of an electronic device is acquired and used as the page height of a video play page. A blank area on the video play page is determined according to the page height and the original height of a hotspot list when an original number of video items are completely displayed in the hotspot list. The original number is adjusted according to the blank area to obtain the target number of to-be-displayed video items in the hotspot list. The hotspot list is displayed on the video play page, and a target number of video items of hotspot videos are displayed in the hotspot list.

20 Claims, 6 Drawing Sheets

(58) Field of Classification Search
USPC .......................................................... 705/7.39
See application file for complete search history.

(56) References Cited

U.S. PATENT DOCUMENTS

| | | | |
|---|---|---|---|
| 2016/0132222 A1* | 5/2016 | Yoo | G06F 3/016 |
| | | | 715/763 |
| 2016/0150259 A1* | 5/2016 | Sokolov | H04N 21/234309 |
| | | | 725/27 |
| 2017/0318350 A1 | 11/2017 | Wielgosz | |
| 2018/0121047 A1 | 5/2018 | Goel et al. | |
| 2019/0182371 A1* | 6/2019 | Ashall | H04M 1/72469 |
| 2021/0334547 A1* | 10/2021 | Cohen-Tidhar | G06V 10/82 |

FOREIGN PATENT DOCUMENTS

| | | |
|---|---|---|
| CN | 106294640 A | 1/2017 |
| CN | 108712673 A | 10/2018 |
| CN | 109640158 A | 4/2019 |
| CN | 109753196 A | 5/2019 |
| CN | 109783181 A | 5/2019 |
| CN | 110032700 A | 7/2019 |
| CN | 110149557 A | 8/2019 |
| CN | 110569454 A | 12/2019 |
| CN | 111381739 A | 7/2020 |
| CN | 111399789 A | 7/2020 |
| CN | 111399956 A | 7/2020 |
| CN | 112423084 A | 2/2021 |
| EP | 3016319 A1 | 5/2016 |
| JP | 2015138341 A | 7/2015 |
| JP | 6080346 B2 | 2/2017 |
| KR | 20090076388 A | 7/2009 |

OTHER PUBLICATIONS

First Office Action issued Feb. 9, 2022 in Chinese Application No. 202011255844.2, with English translation (12 pages).
Second Office Action issued May 10, 2022 in Chinese Application No. 202011255844.2, with English translation (14 pages).
European Search Report for EP Patent Application No. 21891039.6, Issued on Mar. 19, 2024, 4 pages.
Office action received from Indian patent application No. 202327033074 mailed on Sep. 25, 2024, 7 pages.
Written Opinion for International Application No. PCT/CN2021/128790, mailed Jan. 12, 2022, 8 Pages.

* cited by examiner

HOTSPOT LIST DISPLAY METHOD, ELECTRONIC DEVICE, AND STORAGE MEDIUM

CROSS-REFERENCE TO RELATED APPLICATIONS

This is a continuation of International Patent Application No. PCT/CN2021/128790, filed on Nov. 4, 2021, which claims priority to Chinese Patent Application No. 202011255844.2 filed with the China National Intellectual Property Administration (CNIPA) on Nov. 11, 2020, the disclosures of which are incorporated herein by reference in their entireties.

TECHNICAL FIELD

The present disclosure relates to the field of computer technology, for example, a hotspot list display method, an electronic device, and a storage medium.

BACKGROUND

When a list is displayed, the number of list entries displayed in the list needs to be determined. In the related art, a fixed number of list entries are generally set to be displayed in the list. Alternatively, the corresponding display number of list entries is preset for terminals of several common models.

However, with the arrangement in the related art, the display of the list can be only adapted to the terminals for which the display number of list entries is set. When the list is displayed in a terminal of another model, the case of an excessively large blank area or an incomplete display of the list may occur, causing a poor user experience on list viewing.

SUMMARY

The present disclosure provides a hotspot list display method, an electronic device, and a storage medium to dynamically adjust the number of video items displayed in a hotspot list.

The present disclosure provides a hotspot list display method. The method includes the following:

A screen height of a screen of an electronic device is acquired and used as a page height of a video play page.

A blank area on the video play page is determined according to the page height and an original height of a hotspot list at the time when an original number of video items are completely displayed in the hotspot list.

The original number is adjusted according to the blank area to obtain a target number of to-be-displayed video items in the hotspot list.

The hotspot list is displayed on the video play page, and a target number of video items of hotspot videos are displayed in the hotspot list.

The present disclosure also provides an electronic device. The electronic device includes one or more processors and a memory configured to store one or more programs.

The one or more processors are caused to perform the preceding hotspot list display method when executing the one or more programs.

The present disclosure also provides a computer-readable storage medium. The storage medium stores a computer program which, when executed by a processor, causes the processor to perform the preceding hotspot list display method.

DETAILED DESCRIPTION

Embodiments of the present disclosure are described hereinafter with reference to the drawings. The drawings illustrate some embodiments of the present disclosure, but the present disclosure may be implemented in various manners and should not be limited to the embodiments set forth herein. These embodiments are provided for more thorough and complete understanding of the present disclosure. The drawings and embodiments of the present disclosure are only for illustrative purposes.

Steps described in method embodiments of the present disclosure may be performed in sequence and/or in parallel. Additionally, the method embodiments may include additional steps and/or omit the steps shown. The scope of the present disclosure is not limited in this respect.

The term "includes" or its variant used herein means "includes, but is not limited to". The term "based on" means "at least partially based on". The term "an embodiment" means "at least one embodiment". The term "another embodiment" means "at least one other embodiment". The term "some embodiments" means "at least some embodiments". Related definitions of other terms are given in the description hereinafter.

Concepts such as "first" and "second" in the present disclosure are merely intended to distinguish one from another apparatus, module, or unit and are not intended to limit the order or interrelationship of the functions performed by the apparatus, module, or unit.

References to modifications of "one" or "a plurality" mentioned in the present disclosure are intended to be illustrative and not limiting; those skilled in the art should understand that "one" or "a plurality" should be understood as "one or more" unless expressed in the context.

The names of messages or information exchanged among apparatuses in the embodiments of the present disclosure are illustrative and not to limit the scope of the messages or information.

Figure 1:
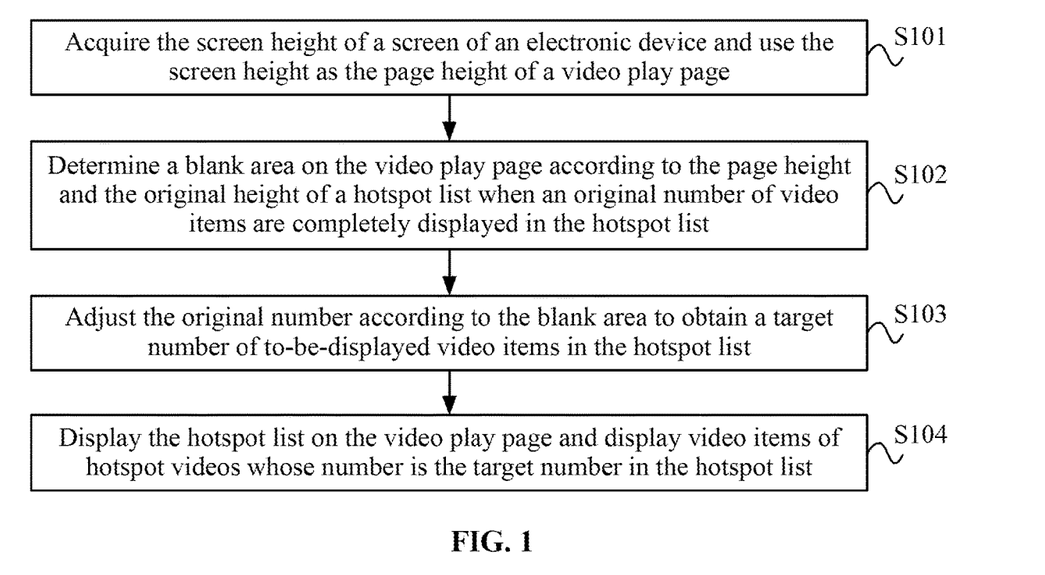
FIG. 1 is a flowchart of a hotspot list display method according to an embodiment of the present disclosure.

FIG. 1 is a flowchart of a hotspot list display method according to an embodiment of the present disclosure. The method may be performed by a hotspot list display apparatus. The apparatus may be implemented in software and/or hardware and may be configured in an electronic device such as a mobile phone or a tablet computer. The hotspot list display method according to the embodiments of the present disclosure is applicable to a scene for displaying a hotspot list. As shown in FIG. 1, the hotspot list display method according to this embodiment may include the steps below.

In S101, the screen height of a screen of an electronic device is acquired and used as the page height of a video play page.

The video play page may be construed as a page displaying a hotspot list and may be any page capable of playing a video in application software. Accordingly, the electronic device is an electronic device installed with the application software to which the video play page belongs. For example, the electronic device is a mobile phone or tablet computer installed with the application software to which the video play page belongs. The screen of the electronic device is the screen of an electronic device installed with the application software to which the video play page belongs.

In this embodiment, the screen height of the screen of the electronic device may be determined based on the device model of the electronic device. The device model may be obtained by reading the device information of the electronic device. When the current condition of the electronic device meets a preset determination condition of the display number of video items of the hotspot list, the electronic device acquires the device model of the electronic device from the device information of the electronic device and determines, according to the device model, the screen height of the screen of the electronic device as the page height of the video play page that is used by the application software for displaying the hotspot list.

In this step, the preset determination condition for triggering the electronic device to acquire the screen height of the screen of the electronic device and further determine the number of to-be-displayed video items in the hotspot list may be set according to needs. For example, the preset determination condition may be set as the complete installation of the application software, the starting of the application software, or the receiving of a trigger operation for displaying the hotspot list. Accordingly, when the installation of the application software is complete, when the application software is started each time, when the application software is started for the first time, or when the trigger operation for displaying the hotspot list is received each time or for the first time, the electronic device may perform the hotspot list display method according to this embodiment to determine the number of to-be-displayed video items in the hotspot list. To avoid that the electronic device needs to repeatedly perform the operation of determining the number of to-be-displayed video items in the hotspot list, and to improve the response speed of the electronic device to the received trigger operation for displaying the hotspot list, the electronic device may determine the number of to-be-displayed video items in the hotspot list only when the installation of the application software is complete, when the application software is started for the first time, or when the trigger operation for displaying the hotspot list is received for the first time. In the following, the case where the electronic device determines the number of to-be-displayed video items in the hotspot list when the application software is started for the first time is used as an example for illustration.

In S102, a blank area on the video play page is determined according to the page height and the original height of the hotspot list when an original number of video items are completely displayed in the hotspot list.

The hotspot list may be any list to be displayed. For example, the hotspot list is a list for displaying video items of hotspot videos with high popularity. The video item of a hotspot video may be construed as video information of the hotspot video and may include at least one of the popularity ranking of the hotspot video, the cover page of the hotspot video, the video name of the hotspot video, or the number of people who are currently viewing the hotspot video. The popularity of a video may be calculated according to parameters, such as the number of times of being viewed, the number of times of being shared, the number of times of being added to favorites, the number of times of being commented on, and the number of times of being liked. The original number may be construed as the preset default display number of video items in the hotspot list. The original number may be preset by an application developer or determined according to the screen type of the screen of the electronic device. That is, the application developer may preset a universal default display number of video items for electronic devices having different screen types or may set different default display numbers of video items for electronic devices having different screen types. This is not limited in this embodiment. The blank area may be construed as an area capable of being used for displaying video items of hotspot videos and located on the video play page other than an original list display area corresponding to the case where an original number of video items are displayed in the hotspot list. The blank area may include only a blank area located below the display area of the hotspot list on the video play page and may also include a blank area located above the display area of the hotspot list on the video play page. In the following, the case where the blank area includes a first blank area located above the display area of the hotspot list and a second blank area located below the display area of the hotspot list on the video play page is used as an example for illustration.

Figure 2:
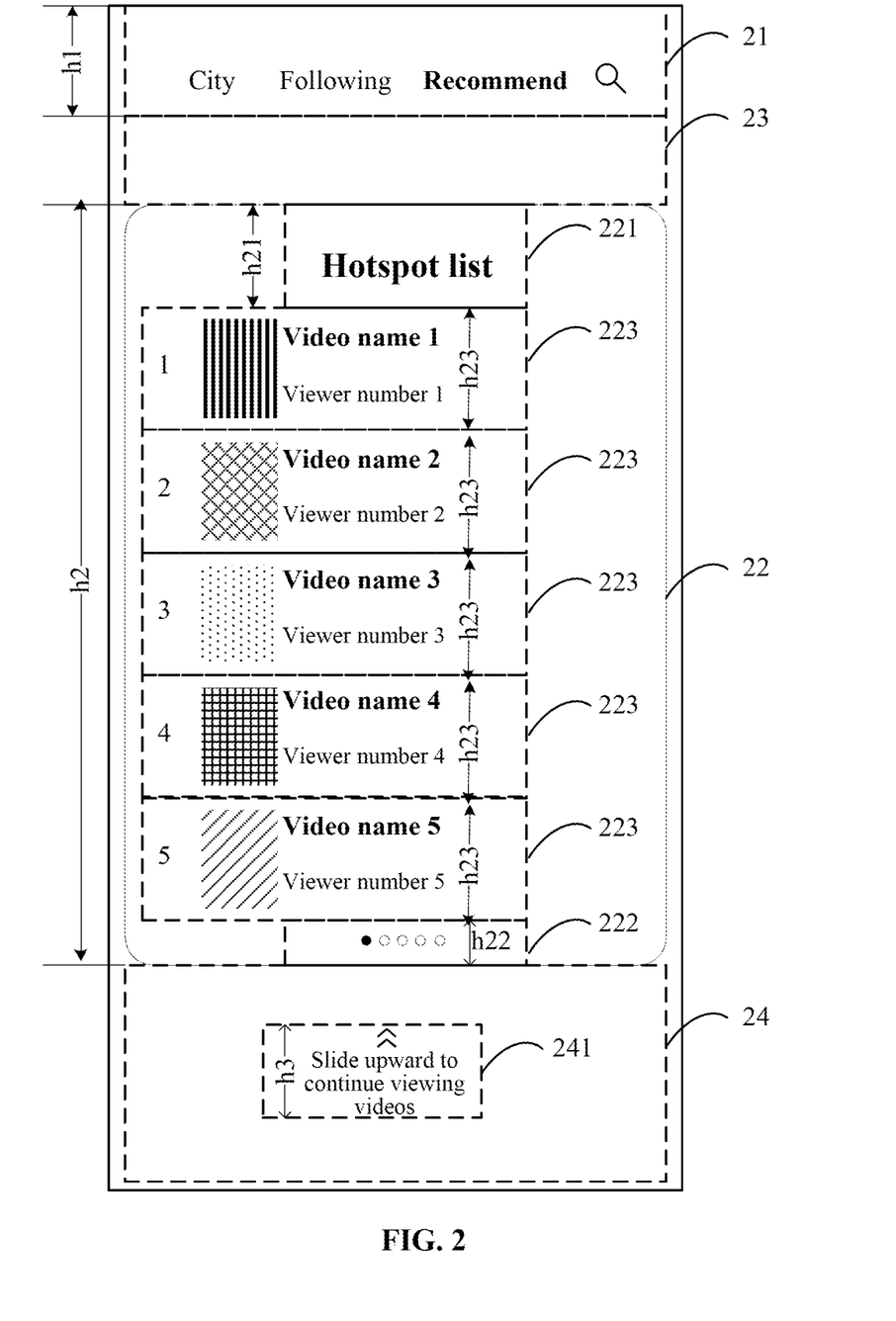
FIG. 2 is a diagram of a video play page according to an embodiment of the present disclosure.

In this embodiment, the blank area may be determined according to the page height information and the original height of the hotspot list at the time when an original number of video items are completely displayed in the hotspot list. As shown in FIG. 2, the original height of the hotspot list at the time when an original number of video items are completely displayed in the hotspot list may be construed as the height h2 of the original list display area 22 when the hotspot list containing an original number of video items is completely displayed on the video play page. The height h2 of original list display area 22 may be calculated from the sum of the height of a sub-display area corresponding to each character in the hotspot list and the height of a sub-display area corresponding to each video item of the hotspot list. Exemplarily, it is assumed that a list title "hotspot list" is displayed on the top of the hotspot list, a page prompt markup is displayed on the bottom of the hotspot list, and an original number (assumed to be n, n equal to is used as an example in FIG. 2) of video items are displayed in the middle of the hotspot list. Moreover, it is assumed that the height of first sub-display area 221 corresponding to the list title is h21, the height of second sub-display area 222 corresponding to the page prompt markup is h22, and the height of third sub-display area 223 corresponding to each video item is h23. In this case, the height h2 of the original list display area 22 of the hotspot list is that h2=h21+h22+n×h23.

In an embodiment, the original number of to-be-displayed video items in the hotspot list may be determined according to the screen type of the screen of the electronic device. That is, different original display numbers of video items may be preset for different screen types. In this case, the hotspot list display method according to this embodiment may further include determining the screen type of the screen of the electronic device and determining the original number of to-be-displayed video items in the hotspot list according to the screen type. The screen type includes a full screen and a non-full screen.

The developer presets different default display numbers of video items for an electronic device equipped with the full screen and an electronic device equipped with the non-full screen. For example, the default display number of video items may be set to 5 for the electronic device equipped with the full screen, and the default display number of video items may be set to 4 for the electronic device equipped with the non-full screen. Accordingly, when a first target height of the remaining blank area on the video play page needs to be calculated, the electronic device may acquire the default display number of video items corresponding to the screen type of the equipped screen as the original number of to-be-displayed video items in the hot spot list.

In S103, the original number is adjusted according to the blank area to obtain a target number of to-be-displayed video items in the hotspot list.

In this embodiment, the original number may be adjusted according to whether a blank area exists on the video play page and according to the first target height of the blank area on the video play page. For example, when no blank area exists on the video play page, the original number is reduced; and when the blank area exists on the video play page and the height of the blank area is greater than the preset display height of a single video item, the original number is increased, thus obtaining the target number of to-be-displayed video items in the hotspot list. Alternatively, the integer part of the ratio of the first target height to the preset display height of a single video item is acquired first, and then the sum of the original number and the integer part is calculated and used as the target number of to-be-displayed video items in the hotspot list.

Considering that the screen heights of different electronic devices generally do not differ greatly, that is, the absolute value of the difference between the original number before adjustment and the target number after the adjustment is generally not greater than 1, in this embodiment, the original number may be adjusted directly according to the relative size between the first target height and the preset display height of a single video item and the sign of the first target height so that the calculation amount required in the process of adjusting the original number is reduced. The step in which the original number is adjusted according to the blank area to obtain the target number of to-be-displayed video items in the hotspot list includes the following: The difference among the page height, the original height, and the control height of a control set on the video play page is acquired and used as the first target height of the blank area; if the first target height is greater than or equal to the preset display height of a single video item, the original number is incremented by 1 to obtain the target number of to-be-displayed video items in the hotspot list; if the first target height is less than the preset display height of a single video item and is greater than or equal to 0, the original number is determined as the target number of to-be-displayed video items in the hotspot list; and if the first target height is less than 0, 1 is subtracted from the original number to obtain the target number of to-be-displayed video items in the hotspot list.

In this embodiment, when the electronic device completely displays an original number of video items in the hotspot list, the first target height of the blank area on the video play page may be obtained by calculating the difference of the page height of the video play page minus the control height of the display area corresponding to the control (including a character/control that requires to be displayed on the video play page) set on the video play page, as well as the original height of the original list display area of the hotspot list at the time when an original number of video items are completely displayed. The height of the display area corresponding to the character/control that requires to be displayed on the video play page may be preset by the developer.

Exemplarily, as shown in FIG. 2, top controls, such as a city control for controlling the electronic device to play videos published by authors located in the same city as the user, a following control for controlling the electronic device to play videos published by authors followed by the user, and a recommend control for controlling the electronic device to play videos recommended by the application software, are set on the top of the video play page. It is assumed that the height of the video play page is H, the height of top control display area 21 for displaying the top controls is h1, and the height of the original list display area 22 corresponding to the hotspot list at the time when an original number of video items are displayed is h2. In this case, the total height of the first blank area 23 above the original list display area 22 and the second blank area 24 below the original list display area 22 is H−h1−h2. Therefore, when no character is displayed in both the first blank area 23 and the second blank area 24, the first target height h of the remaining blank area may be obtained as that h=H−h1−h2. When other characters (for example, guidance information "slide upward to continue viewing videos" in the second blank area 24 as shown in FIG. 2) are displayed in the first blank area 23 and/or the second blank area 24, assuming that the total height occupied by these characters in the first blank area 23 and/or the second blank area 24 is h3, the first target height h of the remaining blank area on the video play page is that h=H−h1−h2−h3.

Figure 3:
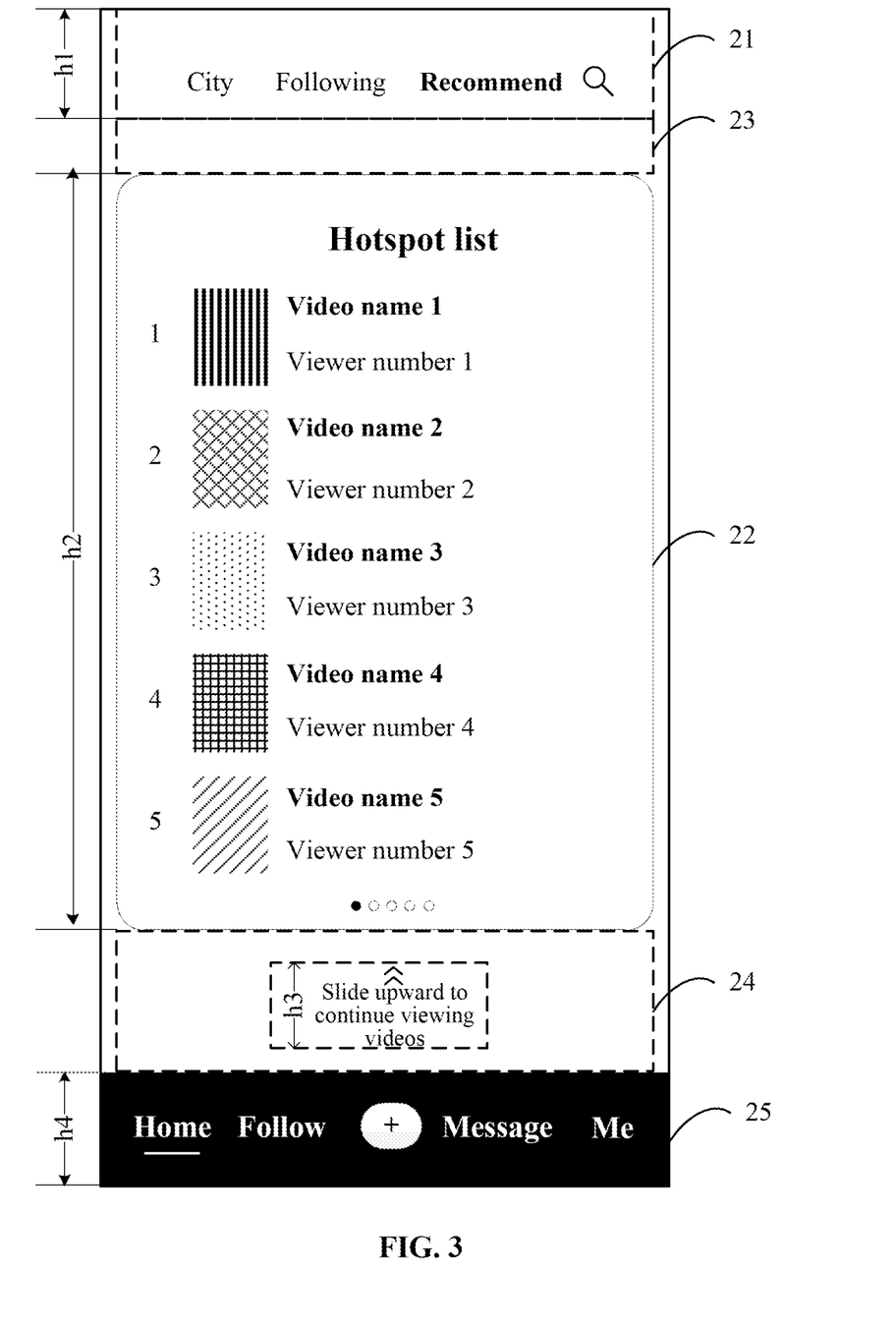
FIG. 3 is a diagram of another video play page according to an embodiment of the present disclosure.

As shown in FIG. 3, when bottom controls, such as a home control for controlling the electronic device to display the home page of the application software, a following control for controlling the electronic device to display the following page of the application software, and a message control for controlling the electronic device to display the message page of the application, are set on the bottom of the video play page, the height of bottom control display area 25 for displaying the bottom controls needs to be further subtracted when the first target height of the remaining blank area on the video play page is calculated. In this case, assuming that the height of the bottom control display area 25 is h4, the first target height h of the remaining blank area on the video play page is that h=H−h1−h2−h3−h4. Whether the bottom controls require to be displayed on the video play page may be determined according to the screen type of the electronic device. For example, when the screen of the electronic device is the full screen, the bottom controls may not be displayed on the bottom of the video play page. When the screen of the electronic device is the non-full screen, the bottom controls may be displayed on the bottom of the video play page.

In the preceding embodiment, after the original number is increased or decreased by 1, it is also feasible to use the original number at this time as a new original number and return to S102 until the first target height is less than the preset display height of a single video item and is greater than or equal to 0. Moreover, the original number at this time is determined as the target number to improve the display effect of the hotspot list on the video play page.

In S104, the hotspot list is displayed on the video play page, and video items of hotspot videos whose number is the target number are displayed in the hotspot list.

In this embodiment, after the target number of to-be-displayed video items in the hotspot list is obtained, the hotspot list containing a target number of video items is displayed on the video play page directly or based on the trigger operation of a user, thus facilitating the user to view the video items in the hotspot list.

In an embodiment, the step in which a target number of video items of hotspot videos are displayed in the hotspot list includes completely displaying, in a first display area of the hotspot list, a target number of current video items contained in the current list page and partially displaying, in a second display area of the hotspot list, a target number of next video items contained in a list page next to the current list page.

The current list page may be construed as the list page currently displayed in the hotspot list. The first display area may be construed as an area located in the hotspot list and used for displaying multiple current video items in the current list page. The second display area may be construed as an area located in the hotspot list and used for displaying multiple next video items on the list page next to the current list page. A current video item may be a video item on the current list page. A next video item may be construed as a video item on the list page next to the current list page.

Figure 4:
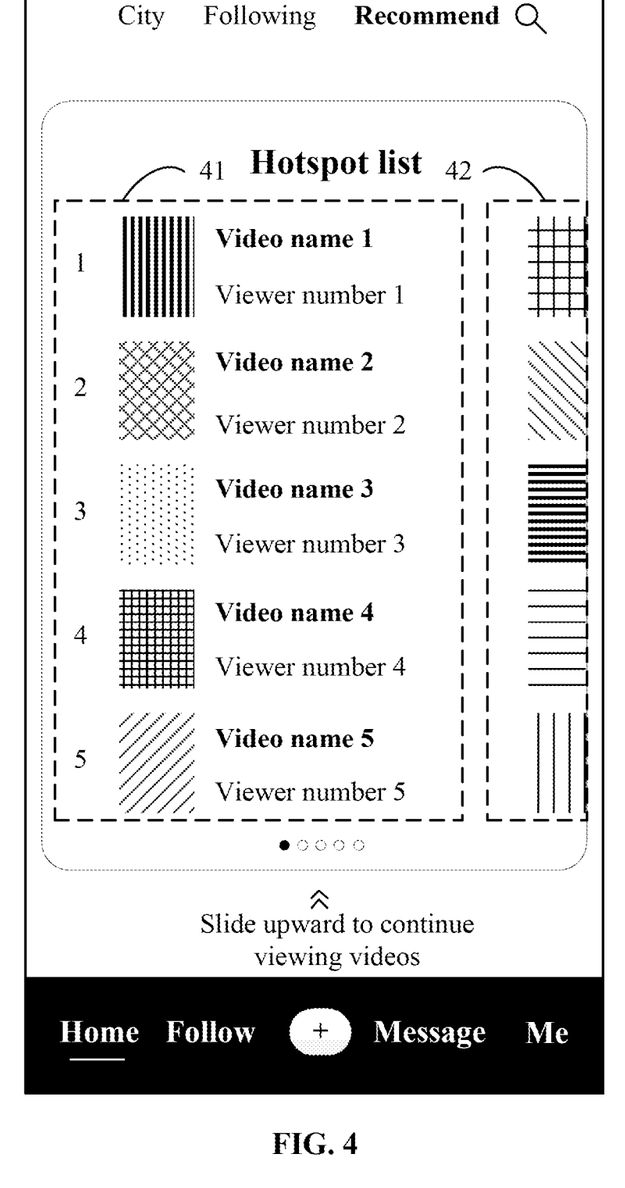
FIG. 4 is a diagram of a hotspot list according to an embodiment of the present disclosure.

In the preceding embodiment, the displayed hotspot list may be divided into multiple list pages for display. When displaying multiple video items in the hotspot list, the electronic device may display video items in the next list page in addition to video items in the current list page to remind the user of the existence of the list page next to the current list page, so that the user can view the hotspot list more easily. In this case, as shown in FIG. 4, the hotspot list may include the first display area 41 and the second display area 42. The width of the second display area 42 may be less than the width of the first display area 41. Accordingly, when displaying multiple video items in the hotspot list, the electronic device may completely display a target number of current video items in the current list page of the hotspot list in the first display area 41 of the hotspot list and display part of the content of a target number of next video items in the next list page of the hotspot list in the second display area 42 of the hotspot list. For example, the electronic device may completely or partially display video cover pages or video names of multiple next video items in the second display area 42. By way of example, in FIG. 4, the target number is 5, and video cover pages of multiple next video items are partially displayed in the second display area 42.

Additionally, to fit a video play scenario to which the video play page belongs and prevent the hotspot list from being displayed too abruptly, when the hotspot list is displayed on the video play page, a preset background video of the hotspot list may also be played at the bottom layer of the hotspot list so that the viewing experience of the user is improved. The step in which the hotspot list is displayed on the video play page includes that the hotspot list is displayed in a floating-window manner on the video play page and the preset background video of the hotspot list is played on the video play page.

The electronic device plays the preset background video of the hotspot list on the video play page, displays the hotspot list in the floating-window manner, and displays a target number of video items of hotspot videos in the hotspot list. Therefore, when the user clicks a video item displayed in the hotspot list, the current display page may be switched from the video play page to a hotspot video play page for playing the hotspot video. A hotspot video corresponding to the video item clicked by the user is played on the hotspot video play page. Moreover, when it is detected that the user slides upward and downward on the hotspot video play page, the hotspot video played on the hotspot video play page is switched according to the ranking of video items of multiple hotspot videos in the hotspot list. The hotspot videos displayed in the hotspot list may be selected according to the popularity ranking of the videos. The preset background video of the hotspot list may be construed as a background video played at the bottom layer of the hotspot list when the hotspot list is displayed. The background video may be a pre-shot video containing audio or a pre-set animation special effect carrying the corresponding audio effect. The background video may be set by the developer. If the user does not instruct the electronic device to stop displaying the hotspot list after the preset background video is completely played, the preset background video may be played again.

For the hotspot list display method according to this embodiment, the screen height of an electronic screen is acquired and used as the page height of a video play page. A blank area on the video play page is determined according to the page height and the original height of a hotspot list when an original number of video items are completely displayed in the hotspot list. The original number is adjusted according to the blank area to obtain the target number of to-be-displayed video items in the hotspot list. Further, the hotspot list is displayed on the video play page, and a target number of video items of hotspot videos are displayed in the hotspot list. In this embodiment, by using the preceding technical scheme, the number of to-be-displayed video items in the hotspot list can be dynamically adjusted according to the height of the screen of the electronic device so that the case of an excessively large blank area or an incomplete display of the list does not occur when the hotspot list is displayed in the electronic device, improving the user experience when the hotspot list is viewed by the user.

Figure 5:
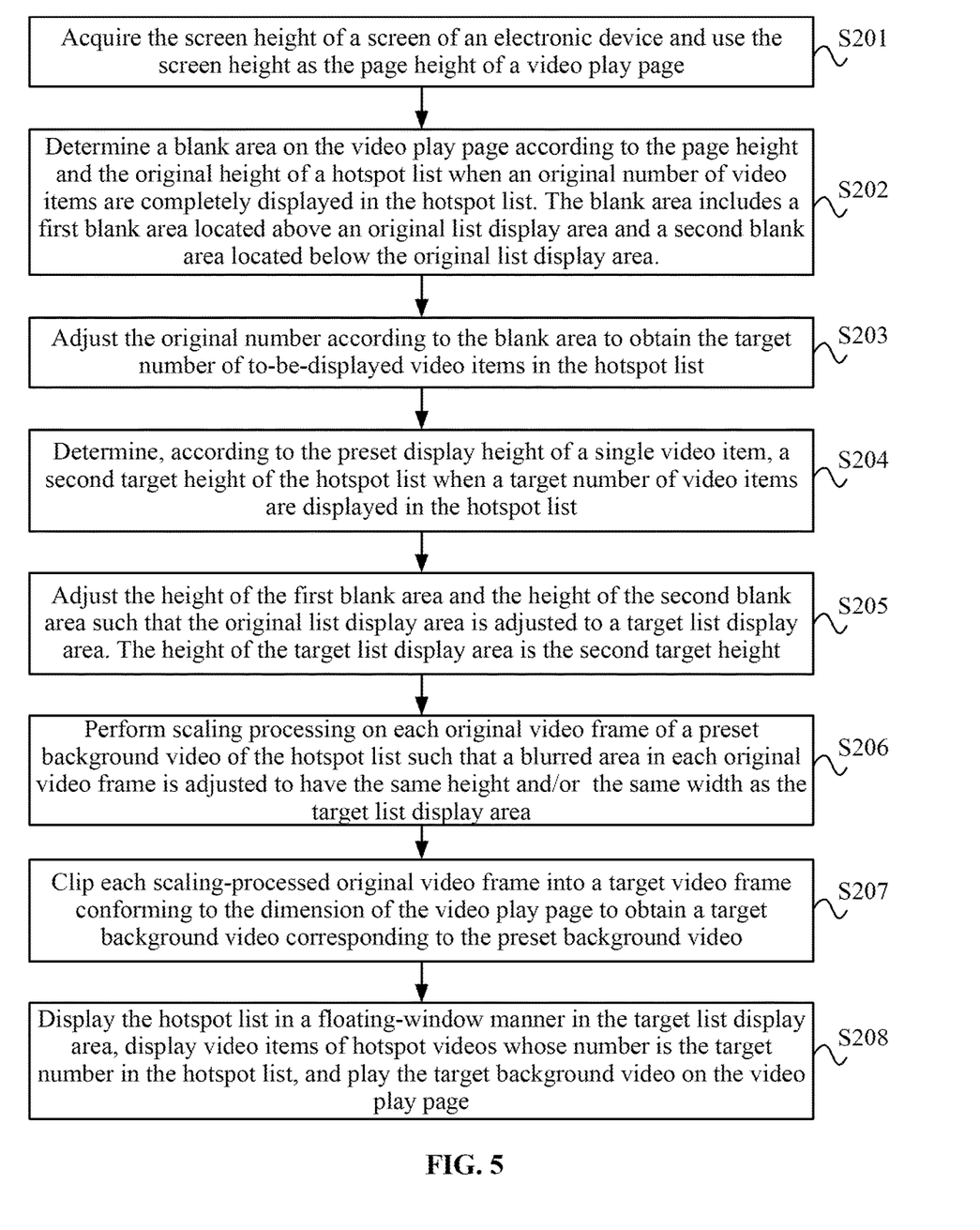
FIG. 5 is a flowchart of another hotspot list display method according to an embodiment of the present disclosure.

FIG. 5 is a flowchart of another hotspot list display method according to an embodiment of the present disclosure. The scheme of this embodiment may be combined with one or more of the alternatives of the previous embodiments. In an embodiment, the blank area may include a first blank area located above the original list display area and a second blank area located below the original list display area. The step in which the hotspot list is displayed in the floating-window manner on the video play page includes the following: When a target number of video items are displayed in the hotspot list, a second target height of the hotspot list is determined according to the preset display height of a single video item, the height of the first blank area and the height of the second blank area are adjusted such that the original list display area is adjusted to a target list display area, and the hotspot list is displayed in the floating-window manner in the target list display area. The height of the target list display area is the second target height.

In an embodiment, each original video frame of the preset background video may contain a blurred area. The step in which the preset background video of the hotspot list is played on the video play page includes the following: Scaling processing is performed on each original video frame of the preset background video of the hotspot list such that the blurred area in each original video frame is adjusted to have the same height and/or width as the target list display area, each scaling-processed original video frame is clipped into a target video frame conforming to the dimension of the video play page to obtain a target background video corresponding to the preset background video, and the target background video is played on the video play page.

Accordingly, as shown in FIG. 5, the hotspot list display method according to this embodiment may include the following:

In S201, the screen height of a screen of an electronic device is acquired and used as the page height of a video play page.

In S202, a blank area on the video play page is determined according to the page height and the original height of a hotspot list when an original number of video items are completely displayed in the hotspot list. The blank area includes the first blank area located above the original list display area and the second blank area located below the original list display area.

The original list display area may be construed as an area occupied by the original list on the video play page at the time when an original number of video items are completely displayed in the hotspot list.

In S203, the original number is adjusted according to the blank area to obtain the target number of to-be-displayed video items in the hotspot list.

In S204, when a target number of video items are displayed in the hotspot list, a second target height of the hotspot list is determined according to the preset display height of a single video item.

The second target height may be construed as the height of the hotspot list when a target number of video items are displayed in the hotspot list.

In this embodiment, when a target number of video items are displayed in the hotspot list, the second target height of the hotspot list may be calculated from the sum of the height of the sub-display area corresponding to each character in the hotspot list and the height of the sub-display area corresponding to each video item in the hotspot list. For example, it is assumed that the list title "hotspot list" is displayed on the top of the hotspot list, the page prompt markup is displayed on the bottom of the hotspot list, the height of the first sub-display area corresponding to the list title is h21, the height of the second sub-display area corresponding to the page prompt markup is h22, and the height of the third sub-display area corresponding to a single video item is h23. In this case, when a target number (assumed as m) of video items are displayed in the hotspot list, the height hm of the hotspot list is equal to $h21+h22+m \times h23$.

In S205, the height of the first blank area and the height of the second blank area are adjusted such that the original list display area is adjusted to a target list display area. The height of the target list display area is the second target height.

In this embodiment, the height of the first blank area and the height of the second blank area may be adjusted in equal or unequal proportions as long as the height of the original list display area is adjusted to the second target height and as long as characters that require to be displayed in the first blank area and the second blank area can be completely displayed in the first blank area and the second blank area after the adjustment. When the hotspot list is displayed, the ratio of the height of the first blank area to the height of the second blank area on the video play page may be set to a set proportionality coefficient, for example, 3/7. Accordingly, after the sum of the height of the first blank area and the height of the second blank area is calculated, the height of the first blank area before adjustment and the height of the second blank area before adjustment may be calculated based on the set proportionality coefficient.

For example, the height of the first blank area and the height of the second blank area may be adjusted in equal proportion. When the original list display area is adjusted to the target list display area, the following operations may be performed: The difference between the second target height and the height of the original list display area is calculated, the sum of the height of the first blank area before adjustment and the height of the second blank area before adjustment is calculated, the ratio of the difference to the sum is calculated and used as the target proportion, and the first blank area and the second blank area are each reduced by the target proportion. For example, the product of the height of the first blank area and the target proportion is calculated and used as a first to-be-adjusted height, and the product of the height of the second blank area and the target proportion is calculated and used as a second to-be-adjusted height. The lower boundary of the first blank area is shifted upward by the first to-be-adjusted height. The upper boundary of the second blank area is shifted downward by the second to-be-adjusted height. The adjusted lower boundary of the first blank area is determined as the upper boundary of the target list display area. The upper boundary of the adjusted second blank area is determined as the lower boundary of the target list display area. Moreover, the left boundary and the right boundary of the original list display area are determined as the left boundary and the right boundary of the target list display area respectively. In this manner, the target display area is obtained.

Exemplarily, it is assumed that the height of the first blank area before adjustment is h41, the height of the second blank area before adjustment is h42, the height of the original list display area is h2, and the second target height is h5. In this case, the lower boundary of the first blank area requires to be shifted upward by a distance (that is, the first to-be-adjusted height) of L1, where $L1=h41(h5-h2)/(h41+h42)$; and the upper boundary of the second blank area requires to be shifted downward by a distance (that is, the second to-be-adjusted height) of L2, where $L2=h42(h5-h2)/(h41+h42)$.

If other characters are displayed in the first/second blank area, after the position of the lower boundary of the first blank area and the position of the upper boundary of the second blank area are adjusted, the positions of other characters displayed in the first/second blank area may be adjusted to ensure that other characters in the first/second blank area can be displayed normally in the first/second blank area after adjustment.

In S206, scaling processing is performed on each original video frame of a preset background video of the hotspot list such that a blurred area in each original video frame has the same height and/or width as the target list display area. Each original video frame of the preset background video contains the blurred area.

In this embodiment, a blurred area may be preset in each original video frame of the preset background video of the hotspot list, and the blurred area in each original video frame is adjusted to the area having the same height and/or the same width as the target list display area. In this manner, when the hotspot list is displayed, the picture in the background video displayed in the display area (that is, the target list display area) of the hotspot list is blurred so that the playing of the background video does not interfere with the hotspot video viewing of the user. The blurred area may be construed as an area in which the blurring processing is performed on the picture in the original video frame. The manner in which the blurring processing is performed on the picture in the video frame may be selected according to requirements. For example, by using the Gaussian blurring technique, each video frame not containing a blurred area in the original background video may be processed to be a video frame containing the blurred area, thereby obtaining the preset background video of the hotspot list.

In this step, for each original video frame in the preset background video, it is feasible to make the blurred area in an original video frame have the same height and width as the target list display area by scaling both the height and the width of the original video frame in unequal proportions, or it is feasible to make the blurred area in an original video frame have the same height and width as the target list display area by scaling both the height and the width of the original video frame in equal proportion. This is not limited in this embodiment.

In this embodiment, to ensure the picture display effect of the preset background video, the height of the original video frame and the width of the original video frame may be scaled in equal proportion. In this case, for each original video frame in the preset background video, it is feasible to make an original video frame have the same height as the target list display area by scaling both the height and the width of the original video frame in equal proportion, regardless of the moving direction of a target object having a movement in the preset background video. Alternatively, for each original video frame in the preset background video, it is feasible to, when the moving direction of a target object having a movement in the preset background video is considered, perform the following operations: When the target object mainly moves out of the blurred area from the upper or lower boundary of the blurred area, the height of the original video frame and the width of the original video frame are scaled in equal proportion until the blurred area has the same height as the target list display area, and when the target object mainly moves out of the blurred area from the left or right boundary of the blurred area, the height of the original video frame and the width of the original video frame are scaled in equal proportion until the blurred area has the same width as the target list display area. In this manner, when the target object moves out of the target list display area, that is, the display of the target object changes from blurred to clear, the display effect of the hotspot list is improved.

In S207, each scaling-processed original video frame is clipped into a target video frame conforming to the dimension of the video play page to obtain a target background video corresponding to the preset background video.

Exemplarily, each original video frame after the scaling processing may be placed at the position where the upper boundary and the lower boundary (or the left boundary and the right boundary) of the blurred area in each original video frame overlap the upper boundary and the lower boundary (or the left boundary and the right boundary) of the target list display area respectively. With the boundary of the video play area on the video play page as a clipping line, each original video frame is clipped to obtain a target video frame whose dimension conforms to the dimension of the video play area on the video play page, and a video composed of each target video frame is determined as the target background video. The video play area on the video play page may be construed as an area located on the video play page and capable of being used for displaying a video picture in the played video, and this area may be all or part of the video play page. For example, when the video play page does not contain an area not capable of being used for displaying a video picture in the played video (as shown in FIG. 2), the boundary of the video play page may be determined as the boundary of the video play area; and when the video play page contains the area (for example, bottom control display area 25 shown in FIG. 3) not capable of being used for displaying a video picture in the played video, an area located on the video play page and other than the area not capable of being used for displaying a video picture in the played video may be determined as the video play area.

In S208, the hotspot list is displayed in a floating-window manner in the target list display area, a target number of video items of hotspot videos are displayed in the hotspot list, and the target background video is played on the video play page.

The target background video corresponding to the preset background video is played on the video play page. The hotspot list is displayed in the floating-window manner in the target list display area on the video play page. A target number of video items of hotspot videos are displayed in the hotspot list.

In this embodiment, the electronic device may execute S208 after receiving a trigger operation for displaying the hotspot list. The trigger operation may be construed as any operation for instructing the electronic device to display the hotspot list on the video play page, for example, an operation of clicking a corresponding control displayed on the video play page, or an upward or downward slide operation performed on the video play page and satisfying a trigger condition for displaying the hotspot list. This is not limited in this embodiment.

By way of example, the trigger operation is an upward or downward slide operation (namely, having an upward slide direction or a downward slide direction) performed on the video play page and satisfying the trigger condition of the hotspot list. When intending to switch the content displayed on the video play page, the user slides upward or downward on the video play page. Accordingly, when detecting the upward slide operation or the downward slide operation acted on the video play page, the electronic device determines whether the slide operation satisfies the trigger condition of the hotspot list, and performs the subsequent operations when the trigger condition of the hotspot list is satisfied. Here the trigger condition for displaying the hotspot list may be set by the developer according to requirements. For example, when the upward or downward slide operation performed by the user on the video play page is an $i^{th}$ (i is a positive integer) upward or downward slide operation performed in a preset time period (for example, 7:00 to 8:00 and/or 20:00 to 21:00 every day), or when the first to-be-displayed content corresponding to the upward or downward slide operation in a video stream of the video play page is the hotspot list, it may be determined that the upward or downward slide operation satisfies the trigger condition for displaying the hotspot list.

For the hotspot list display method according to this embodiment, not only a suitable number of video items can be displayed in the hotspot list, but also a video picture which is in the background video of the hotspot list and located in the display area of the hotspot list can be adjusted to a blurred picture, thereby preventing the background video from interfering with the hotspot list viewing of the user, and improving the display effect of the hotspot list.

Figure 6:
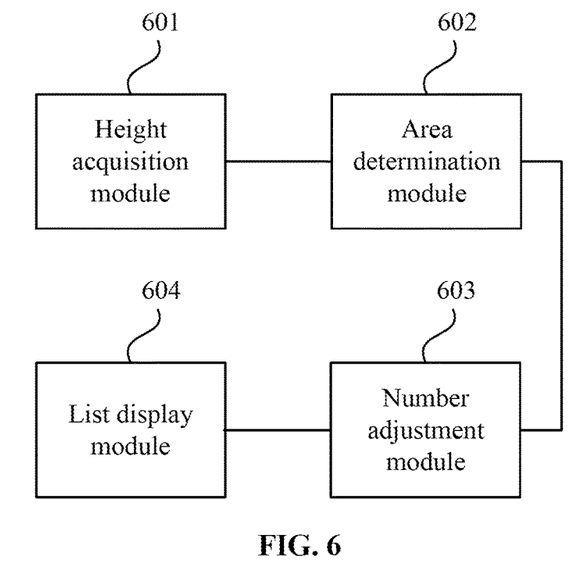
FIG. 6 is a block diagram of a hotspot list display apparatus according to an embodiment of the present disclosure.

FIG. 6 is a block diagram of a hotspot list display apparatus according to an embodiment of the present disclosure. The apparatus may be implemented in software and/or hardware and may be configured in an electronic device such as a mobile phone or a tablet computer. The display number of video items in the hotspot list may be determined by performing the hotspot list display method.

As shown in FIG. 6, the hotspot list display apparatus according to this embodiment may include a height acquisition module 601, an area determination module 602, a number adjustment module 603, and a list display module 604.

The height acquisition module 601 is configured to acquire the screen height of a screen of an electronic device and use the screen height as the page height of a video play page. The area determination module 602 is configured to determine a blank area on the video play page according to the page height and the original height of a hotspot list when an original number of video items are completely displayed in the hotspot list. The number adjustment module 603 is configured to adjust the original number according to the blank area to obtain the target number of to-be-displayed video items in the hotspot list. The list display module 604 is configured to display the hotspot list on the video play page and display video items of hotspot videos whose number is the target number in the hotspot list.

For the hotspot list display apparatus according to this embodiment, the height acquisition module is configured to acquire and use the screen height of an electronic screen as the page height of a video play page. The area determination module is configured to determine a blank area on the video play page according to the page height and the original height of a hotspot list when an original number of video items are completely displayed in the hotspot list. The number adjustment module is configured to adjust the original number according to the blank area to obtain the target number of to-be-displayed video items in the hotspot list. Further, the list display module is configured to display the hotspot list on the video play page and display a target number of video items of hotspot videos in the hotspot list. In this embodiment, by using the preceding technical scheme, the number of to-be-displayed video items in the hotspot list can be dynamically adjusted according to the height of the screen of the electronic device so that the case of an excessively large blank area or an incomplete display of the list does not occur when the hotspot list is displayed in the electronic device, improving the experience of the user viewing the hotspot list.

In the preceding scheme, the number adjustment module 603 is configured to perform the following operations: The difference of the page height minus the original height and the control height of a control set on the video play page is acquired and used as a first target height of the blank area. If the first target height is greater than or equal to the preset display height of a single video item, the original number is incremented by 1 to obtain the target number of to-be-displayed video items in the hotspot list. If the first target height is less than the preset display height of a single video item and is greater than or equal to 0, the original number is determined as the target number of to-be-displayed video items in the hotspot list. If the first target height is less than 0, 1 is subtracted from the original number to obtain the target number of to-be-displayed video items in the hotspot list.

The hotspot list display apparatus according to this embodiment may also include a type determination module and a number determination module. The type determination module is configured to determine the screen type of the screen of the electronic device. The screen type includes a full screen and a non-full screen. The number determination module is configured to determine the original number of to-be-displayed video items in the hotspot list according to the screen type.

In the preceding scheme, the list display module 604 is configured to display the hotspot list in a floating-window manner on the video play page, display video items of hotspot videos whose number is the target number in the hotspot list, and play a preset background video of the hotspot list on the video play page.

In the preceding scheme, the blank area includes a first blank area located above an original list display area and a second blank area located below the original list display area. The list display module 604 may include a height determination unit, an area adjustment unit, and a list display unit. The height determination unit is configured to, according to the preset display height of a single video item, determine a second target height of the hotspot list when a target number of video items are displayed in the hotspot list. The area adjustment unit is configured to adjust the height of the first blank area and the height of the second blank area such that the original list display area is adjusted to a target list display area. The height of the target list display area is the second target height. The list display unit is configured to display the hotspot list in the floating-window manner in the target list display area and display a target number of video items of hotspot videos in the hotspot list.

In the preceding scheme, each original video frame of the preset background video contains a blurred area. The list display module 604 may also include a video scaling unit, a video clipping unit, and a video play unit. The video scaling unit is configured to perform scaling processing on each original video frame of the preset background video of the hotspot list such that the blurred area in each original video frame has the same height and/or width as the target list display area. The video clip unit is configured to clip each scaling-processed original video frame into a target video frame conforming to the dimension of the video play page to obtain a target background video corresponding to the preset background video. The video play unit is configured to play the target background video on the video play page.

In the preceding scheme, the list display module 604 may include a video item display unit. The video item display unit is configured to completely display, in a first display area of the hotspot list, a target number of current video items contained in a current list page and partially display, in a second display area of the hotspot list, a target number of next video items contained in a list page next to the current list page.

The hotspot list display apparatus of this embodiment of the present disclosure may perform the hotspot list display method of any embodiment of the present disclosure and has function modules and effects corresponding to the performed method. For technical details not described in detail in this embodiment, reference is made to the hotspot list display method of any embodiment of the present disclosure.

Figure 7:
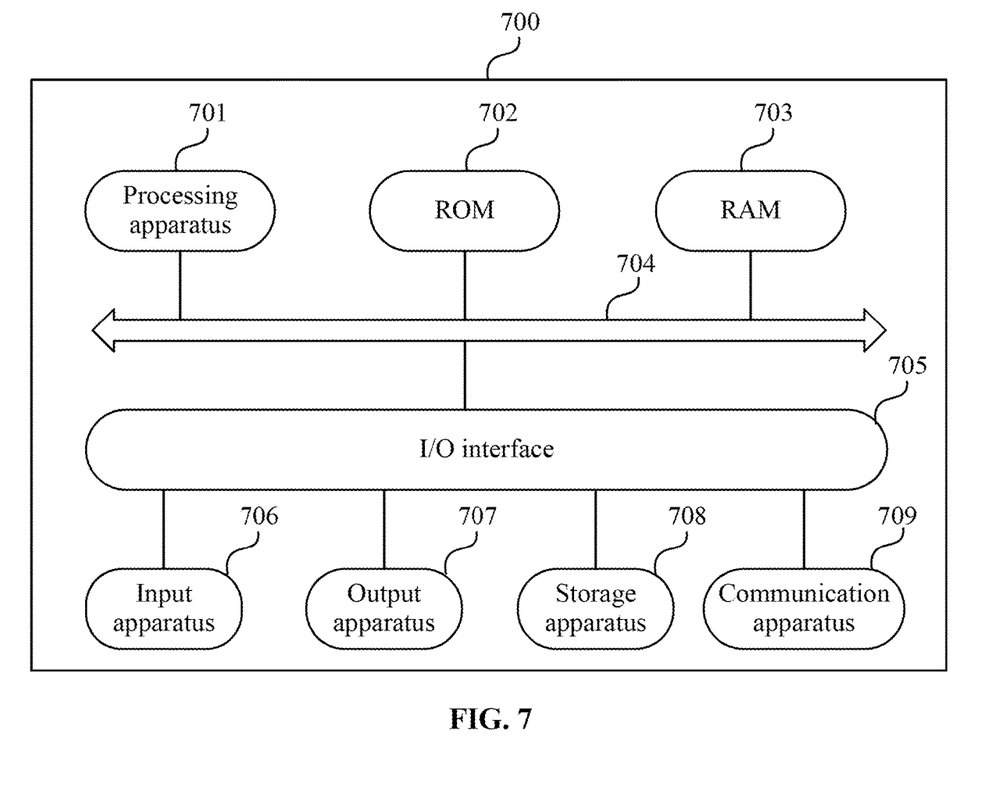
FIG. 7 is a structural diagram of an electronic device according to an embodiment of the present disclosure.

Referring to FIG. 7, FIG. 7 shows a structural diagram of an electronic device (such as a terminal device) 700 suitable for implementing the embodiments of the present disclosure. The terminal device in the embodiments of the present disclosure may include, but is not limited to, a mobile terminal, such as a mobile phone, a laptop, a digital broadcast receiver, a personal digital assistant (PDA), a portable Android device (PAD), a portable media player (PMP) and an in-vehicle terminal (such as an in-vehicle navigation terminal) and a stationary terminal such as a digital television (TV), and a desktop computer. The electronic device shown in FIG. 7 is an example and not intended to limit the function and use range of the embodiments of the present disclosure.

As shown in FIG. 7, the electronic device 700 may include a processing apparatus 701 (such as a central processing unit or a graphics processing unit). The processing apparatus 701 may perform various types of appropriate operations and processing according to a program stored in a read-only memory (ROM) 702 or a program loaded from a storage apparatus 708 to a random access memory (RAM) 703. The RAM 703 also stores various programs and data required for the operation of the electronic device 700. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 such as a touch screen, a touchpad, a keyboard, a mouse, a camera, a microphone, an accelerometer, or a gyroscope; an output apparatus 707 such as a liquid crystal display (LCD), a speaker, or a vibrator; the storage apparatus 708 such as a magnetic tape or a hard disk; and a communication apparatus 709. The communication apparatus 709 may allow the electronic device 700 to perform wireless or wired communication with other devices to exchange data. Although FIG. 7 shows the electronic device 700 having various apparatuses, not all the apparatuses shown here need to be implemented or present. Alternatively, more or fewer apparatuses may be implemented or present.

According to an embodiment of the present disclosure, the above-described process with reference to flowcharts may be implemented as a computer software program. For example, a computer program product is included in the embodiments of the present disclosure. The computer program product includes a computer program carried on a non-transitory computer-readable medium. The computer program includes program codes for performing the methods shown in the flowcharts. In such embodiments, the computer program may be downloaded and installed from a network through the communication apparatus 709, installed from the storage apparatus 708, or installed from the ROM 702. When the computer program is executed by the processing apparatus 701, the preceding functions defined in the methods in embodiments of the present disclosure are implemented.

The preceding computer-readable medium of the present disclosure may be a computer-readable signal medium or a computer-readable storage medium or any combination thereof. For example, the computer-readable storage medium may be, but is not limited to, an electrical, magnetic, optical, electromagnetic, infrared, or semiconductor system, apparatus, or device or any combination thereof. Examples of the computer-readable storage medium may include, but are not limited to, an electrical connection having one or more wires, a portable computer disk, a hard disk, a RAM, a ROM, an erasable programmable read-only memory (EPROM), a flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable signal medium may send, propagate, or transmit a program used by or used in conjunction with the instruction execution system, apparatus, or device. Program codes included on the computer-readable medium may be transmitted by any suitable medium, including, but not limited to, a wire, an optical cable, a radio frequency (RF), or any suitable combination thereof.

In some embodiments, clients and servers may communicate using any network protocol such as hypertext transfer protocol (HTTP) currently known or developed in the future, and may be interconnected via any form or medium of digital data communication (for example, a communication network). Examples of the communication network include a local area network (LAN), a wide area network (WAN), an inter-network (for example, the Internet), a peer-to-peer network (for example, an ad hoc network), and any network currently known or developed in the future.

The preceding computer-readable medium may be contained in the preceding electronic device or may exist alone without being assembled into the electronic device.

The preceding computer-readable medium carries one or more programs which, when executed by the electronic device, cause the electronic device to implement the following functions: The screen height of a screen of an electronic device is acquired and used as the page height of a video play page. A blank area on the video play page is determined according to the page height and the original height of a hotspot list used when an original number of video items are completely displayed in the hotspot list. The original number is adjusted according to the blank area to obtain the target number of to-be-displayed video items in the hotspot list. The hotspot list is displayed on the video play page, and a target number of video items of hotspot videos are displayed in the hotspot list.

Computer program codes for executing operations in the present disclosure may be written in one or more programming languages or a combination thereof. The preceding programming languages include, but are not limited to, an object-oriented programming language such as Java, Smalltalk, or C++ and may also include a conventional procedural programming language such as C or a similar programming language. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer through any type of network, including a LAN or a WAN or may be connected to an external computer (for example, through the Internet provided by an Internet service provider).

The flowcharts and block diagrams in the drawings show possible architectures, functions, and operations of the system, method, and computer program product according to multiple embodiments of the present disclosure. In this regard, each block in the flowcharts or block diagrams may represent a module, a program segment, or part of codes containing one or more executable instructions for implementing specified logical functions. It is also to be noted that in some alternative implementations, the functions marked in the blocks may occur in an order different from those marked in the drawings. For example, two successive blocks may, in fact, be executed basically in parallel or in a reverse order, which depends on the functions involved. It is also to be noted that each block in the block diagrams and/or flowcharts and a combination of blocks in the block diagrams and/or flowcharts may be implemented by a special-purpose hardware-based system executing a specified function or operation or may be implemented by a combination of special-purpose hardware and computer instructions.

The units involved in the embodiments of the present disclosure may be implemented by software or hardware. The name of a module is not intended to limit the unit itself in a certain circumstance.

The functions described above herein may be implemented at least partially by one or more hardware logic components. For example, without limitation, example types of hardware logic components that can be used include a field-programmable gate array (FPGA), an application specific integrated circuit (ASIC), an application-specific standard product (ASSP), a system-on-chip (SoC), a complex programmable logic device (CPLD), and the like.

In the context of the present disclosure, the machine-readable medium may be a tangible medium that may include or store the program used by or used in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any appropriate combination thereof. Examples of the machine-readable storage medium may include an electrical connection based on one or more wires, a portable computer disk, a hard disk, a RAM, a ROM, an EPROM, a flash memory, an optical fiber, a CD-ROM, an optical storage device, a magnetic storage device, or any suitable combination thereof.

According to one or more embodiments of the present disclosure, example one provides a hotspot list display method. The hotspot list display method includes the following:

The screen height of a screen of an electronic device is acquired and used as the page height of a video play page. A blank area on the video play page is determined according to the page height and the original height of a hotspot list when an original number of video items are completely displayed in the hotspot list. The original number is adjusted according to the blank area to obtain the target number of to-be-displayed video items in the hotspot list. The hotspot list is displayed on the video play page, and a target number of video items of hotspot videos are displayed in the hotspot list.

According to one or more embodiments of the present disclosure, in example two according to the method of example one, the step in which the original number is adjusted according to the blank area to obtain the target number of to-be-displayed video items in the hotspot list includes the following:

The difference of the page height minus both the original height and the control height of a control set on the video play page is acquired and used as a first target height of the blank area. If the first target height is greater than or equal to the preset display height of a single video item, the original number is incremented by 1 to obtain the target number of to-be-displayed video items in the hotspot list. If the first target height is less than the preset display height of a single video item and is greater than or equal to 0, the original number is determined as the target number of to-be-displayed video items in the hotspot list. If the first target height is less than 0, 1 is subtracted from the original number to obtain the target number of to-be-displayed video items in the hotspot list.

According to one or more embodiments of the present disclosure, in example three according to the method of example one, the method further includes the following:

The screen type of the screen of the electronic device is determined, and the original number of to-be-displayed video items in the hotspot list is determined according to the screen type. The screen type includes a full screen and a non-full screen.

According to one or more embodiments of the present disclosure, in example four according to the method of any one of examples one to three, the step in which the hotspot list is displayed on the video play page includes the following:

The hotspot list is displayed in a floating-window manner on the video play page, and a preset background video of the hotspot list is played on the video play page.

According to one or more embodiments of the present disclosure, in example five according to the method of example four, the blank area includes a first blank area located above an original list display area and a second blank area located below the original list display area. The step in which the hotspot list is displayed in the floating-window manner on the video play page includes the following:

When a target number of video items are displayed in the hotspot list, a second target height of the hotspot list is determined according to the preset display height of a single video item. The height of the first blank area and the height of the second blank area are adjusted such that the original list display area is adjusted to a target list display area, where the height of the target list display area is the second target height. The hotspot list is displayed in the floating-window manner in the target list display area.

According to one or more embodiments of the present disclosure, in example six according to the method of example five, each original video frame of the preset background video contains a blurred area. The step in which the preset background video of the hotspot list is played on the video play page includes the following:

Scaling processing is performed on each original video frame of the preset background video of the hotspot list such that the blurred area in each original video frame has the same height and/or width as the target list display area. Each scaling-processed original video frame is clipped into a target video frame conforming to the dimension of the video play page to obtain a target background video corresponding to the preset background video. The target background video is played on the video play page.

According to one or more embodiments of the present disclosure, in example seven according to the method of any one of examples one to three, the step in which a target number of video items of hotspot videos are displayed in the hotspot list includes the following:

A target number of current video items contained in the current list page are completely displayed in a first display area of the hotspot list. A target number of next video items contained in a list page next to the current list page are partially displayed in a second display area of the hotspot list.

According to one or more embodiments of the present disclosure, example eight provides a hotspot list display apparatus. The apparatus includes a height acquisition module, an area determination module, a number adjustment module, and a list display module.

The height acquisition module is configured to acquire the screen height of a screen of an electronic device and use the screen height as the page height of a video play page. The area determination module is configured to determine a blank area on the video play page according to the page height and the original height of a hotspot list when an original number of video items are completely displayed in the hotspot list. The number adjustment module is configured to adjust the original number according to the blank area to obtain the target number of to-be-displayed video items in the hotspot list. The list display module is configured to display the hotspot list on the video play page and display a target number of video items of hotspot videos in the hotspot list.

According to one or more embodiments of the present disclosure, example nine provides an electronic device. The electronic device includes one or more processors and a memory configured to store one or more programs. The one or more processors are configured to perform the hotspot list display method of any one of examples one to seven when executing the one or more programs.

According to one or more embodiments of the present disclosure, example ten provides a computer-readable storage medium. The storage medium stores a computer program which, when executed by a processor, causes the processor to perform the hotspot list display method of any one of examples one to seven.

Additionally, although multiple operations are described in a particular order, it should not be construed as that these operations must be performed in this particular order or in sequential order. In a certain environment, multitasking and parallel processing may be advantageous. Similarly, although multiple implementation details are included in the preceding discussion, these should not be construed as a limitation on the scope of the present disclosure. Some features described in the context of separate embodiments may be implemented in combination in a single embodiment. Rather, features described in the context of a single embodiment may be implemented in multiple embodiments individually or in any suitable subcombination.

What is claimed is:

1. A list display method, being executed by an electronic device and comprising:
   acquiring a screen height of a screen of the electronic device and using the screen height as a page height of a video play page displayed on the screen of the electronic device;
   determining a blank area on the video play page according to the page height and an original height of a to-be-displayed list in response to an original number of video items being completely displayed in the to-be-displayed list;
   adjusting the original number according to the blank area to determine a target number of to-be-displayed video items in the to-be-displayed list; and
   displaying the to-be-displayed list on the video play page and displaying video items of hotspot videos whose number is the target number in the to-be-displayed list, to facilitate viewing of the video items in the to-be-displayed list by a user of the electronic device;
   wherein adjusting the original number according to the blank area to determine the target number of to-be-displayed video items in the to-be-displayed list comprises:
   determining a height of the blank area according to the page height, the original height, and a control height of a control set on the video play page;
   in response to the height of the blank area being less than 0, reducing the original number and using the reduced original number as the target number to completely display the to-be-displayed list on the video play page; and
   in response to the height of the blank area being greater than or equal to a preset display height of a single video item, increasing the original number and using the increased original number as the target number to reduce the blank area on the video play page.

2. The list display method of claim 1, wherein adjusting the original number according to the blank area to determine the target number of to-be-displayed video items in the to-be-displayed list comprises:
   acquiring a difference of the page height minus both the original height and the control height, and using the difference as a first target height of the blank area;
   in response to the first target height being greater than or equal to the preset display height of the single video item, incrementing the original number by 1 to determine the target number of to-be-displayed video items in the to-be-displayed list;
   in response to the first target height being less than the preset display height of the single video item and is greater than or equal to 0, determining the original number as the target number of to-be-displayed video items in the to-be-displayed list; and
   in response to the first target height being less than 0, subtracting 1 from the original number to determine the target number of to-be-displayed video items in the to-be-displayed list.

3. The list display method of claim 1, further comprising:
   determining a screen type of the screen of the electronic device, wherein the screen type comprises a full screen and a non-full screen; and
   determining the original number of to-be-displayed video items in the to-be-displayed list according to the screen type.

4. The list display method of claim 1, wherein displaying the to-be-displayed list on the video play page comprises:
   displaying the to-be-displayed list in a floating-window manner on the video play page, and playing a preset background video of the to-be-displayed list on the video play page.

5. The list display method of claim 4, wherein the blank area comprises a first blank area located above an original list display area and a second blank area located below the original list display area, and displaying the to-be-displayed list in the floating-window manner on the video play page comprises:
   determining, according to a preset display height of a single video item, a second target height of the to-be-displayed list in response to the video items whose number is the target number being displayed in the to-be-displayed list;
   adjusting a height of the first blank area and a height of the second blank area to adjust the display area of the original list to a target list display area, wherein a height of the target list display area is the second target height; and
   displaying, in the target list display area, the to-be-displayed list in the floating-window manner.

6. The list display method of claim 5, wherein each original video frame of the preset background video contains a blurred area, and playing the preset background video of the to-be-displayed list on the video play page comprises:

performing scaling processing on each original video frame of the preset background video of the to-be-displayed list to adjust the blurred area in the each original video frame to have at least one of a same height or a same width as the target list display area;

clipping each scaling-processed original video frame into a target video frame conforming to a dimension of the video play page to obtain a target background video corresponding to the preset background video; and playing the target background video on the video play page.

7. The list display method of claim 1, wherein displaying the target number of video items of hotspot videos in the to-be-displayed list comprises:

completely displaying, in a first display area of the to-be-displayed list, current video items whose number is the target number and which are contained in a current list page, and partially displaying, in a second display area of the to-be-displayed list, next video items whose number is the target number and which are contained in a list page next to the current list page.

8. The list display method of claim 2, wherein displaying the to-be-displayed list on the video play page comprises:

displaying the to-be-displayed list in a floating-window manner on the video play page, and playing a preset background video of the to-be-displayed list on the video play page.

9. The list display method of claim 3, wherein displaying the to-be-displayed list on the video play page comprises:

displaying the to-be-displayed list in a floating-window manner on the video play page, and playing a preset background video of the to-be-displayed list on the video play page.

10. The list display method of claim 2, wherein displaying the target number of video items of hotspot videos in the to-be-displayed list comprises:

completely displaying, in a first display area of the to-be-displayed list, current video items whose number is the target number and which are contained in a current list page, and partially displaying, in a second display area of the to-be-displayed list, next video items whose number is the target number and which are contained in a list page next to the current list page.

11. The list display method of claim 3, wherein displaying the target number of video items of hotspot videos in the to-be-displayed list comprises:

completely displaying, in a first display area of the to-be-displayed list, current video items whose number is the target number and which are contained in a current list page, and partially displaying, in a second display area of the to-be-displayed list, next video items whose number is the target number and which are contained in a list page next to the current list page.

12. An electronic device, comprising:

at least one processor; and a memory configured to store at least one program, wherein when executed by the at least one processor, the at least one program causes the at least one processor to perform the following:

acquiring a screen height of a screen of the electronic device and using the screen height as a page height of a video play page displayed on the screen of the electronic device;

determining a blank area on the video play page according to the page height and an original height of a to-be-displayed list in response to an original number of video items being completely displayed in the to-be-displayed list;

adjusting the original number according to the blank area to determine a target number of to-be-displayed video items in the to-be-displayed list; and displaying the to-be-displayed list on the video play page and displaying video items of hotspot videos whose number is the target number in the to-be-displayed list, to facilitate viewing of the video items in the to-be-displayed list by a user of the electronic device;

wherein the at least one processor is caused to perform adjusting the original number according to the blank area to determine the target number of to-be-displayed video items in the to-be-displayed list by:

determining a height of the blank area according to the page height, the original height, and a control height of a control set on the video play page;

in response to the height of the blank area being less than 0, reducing the original number and using the reduced original number as the target number to completely display the to-be-displayed list on the video play page; and in response to the height of the blank area being greater than or equal to a preset display height of a single video item, increasing the original number and using the increased original number as the target number to reduce the blank area on the video play page.

13. The electronic device of claim 12, wherein the at least one processor is caused to perform adjusting the original number according to the blank area to determine the target number of to-be-displayed video items in the to-be-displayed list by:

acquiring a difference of the page height minus both the original height and the control height, and using the difference as a first target height of the blank area;

in response to the first target height being greater than or equal to the preset display height of the single video item, incrementing the original number by 1 to determine the target number of to-be-displayed video items in the to-be-displayed list;

in response to the first target height being less than the preset display height of the single video item and is greater than or equal to 0, determining the original number as the target number of to-be-displayed video items in the to-be-displayed list; and in response to the first target height being less than 0, subtracting 1 from the original number to determine the target number of to-be-displayed video items in the to-be-displayed list.

14. The electronic device of claim 12, wherein the at least one processor is caused to further perform the following:

determining a screen type of the screen of the electronic device, wherein the screen type comprises a full screen and a non-full screen; and determining the original number of to-be-displayed video items in the to-be-displayed list according to the screen type.

15. The electronic device of claim 12, wherein the at least one processor is caused to perform displaying the to-be-displayed list on the video play page by:

displaying the to-be-displayed list in a floating-window manner on the video play page, and playing a preset background video of the to-be-displayed list on the video play page.

16. The electronic device of claim 15, wherein the blank area comprises a first blank area located above an original list display area and a second blank area located below the original list display area, and the at least one processor is caused to perform displaying the to-be-displayed list in the floating-window manner on the video play page by:

determining, according to a preset display height of a single video item, a second target height of the to-be-displayed list in response to the video items whose number is the target number being displayed in the to-be-displayed list;

adjusting a height of the first blank area and a height of the second blank area to adjust the display area of the original list to a target list display area, wherein a height of the target list display area is the second target height; and     displaying, in the target list display area, the to-be-displayed list in the floating-window manner.

17. The electronic device of claim 16, wherein each original video frame of the preset background video contains a blurred area, and the at least one processor is caused to perform playing the preset background video of the to-be-displayed list on the video play page by:

performing scaling processing on each original video frame of the preset background video of the to-be-displayed list to adjust the blurred area in the each original video frame to have at least one of a same height or a same width as the target list display area;

clipping each scaling-processed original video frame into a target video frame conforming to a dimension of the video play page to obtain a target background video corresponding to the preset background video; and     playing the target background video on the video play page.

18. The electronic device of claim 12, wherein the at least one processor is caused to perform displaying the target number of video items of hotspot videos in the to-be-displayed list by:

completely displaying, in a first display area of the to-be-displayed list, current video items whose number is the target number and which are contained in a current list page, and partially displaying, in a second display area of the to-be-displayed list, next video items whose number is the target number and which are contained in a list page next to the current list page.

19. A non-transitory computer-readable storage medium storing a computer program which, when executed by a processor, causes the processor to perform the following:

acquiring a screen height of a screen of an electronic device and using the screen height as a page height of a video play page displayed on the screen of the electronic device;

determining a blank area on the video play page according to the page height and an original height of a to-be-displayed list in response to an original number of video items being completely displayed in the to-be-displayed list;

adjusting the original number according to the blank area to determine a target number of to-be-displayed video items in the to-be-displayed list; and     displaying the to-be-displayed list on the video play page and displaying video items of hotspot videos whose number is the target number in the to-be-displayed list, to facilitate viewing of the video items in the to-be-displayed list by a user of the electronic device;

wherein the processor is caused to perform adjusting the original number according to the blank area to determine the target number of to-be-displayed video items in the to-be-displayed list by:

determining a height of the blank area according to the page height, the original height, and a control height;

in response to the height of the blank area being less than 0, reducing the original number and using the reduced original number as the target number to completely display the to-be-displayed list on the video play page; and     in response to the height of the blank area being greater than a preset display height of a single video item, increasing the original number and using the increased original number as the target number to reduce the blank area on the video play page.

20. The non-transitory computer-readable storage medium of claim 19, wherein the processor is caused to perform adjusting the original number according to the blank area to determine the target number of to-be-displayed video items in the to-be-displayed list by:

acquiring a difference of the page height minus both the original height and the control height, and using the difference as a first target height of the blank area;

in response to the first target height being greater than or equal to the preset display height of the single video item, incrementing the original number by 1 to determine the target number of to-be-displayed video items in the to-be-displayed list;

in response to the first target height being less than the preset display height of the single video item and is greater than or equal to 0, determining the original number as the target number of to-be-displayed video items in the to-be-displayed list; and     in response to the first target height being less than 0, subtracting 1 from the original number to determine the target number of to-be-displayed video items in the to-be-displayed list.

* * * * *